Dec. 23, 1958 J. E. LUCAS 2,865,597
LEAKPROOF PRESSURE SEALED VALVES
Filed July 21, 1953 2 Sheets-Sheet 2
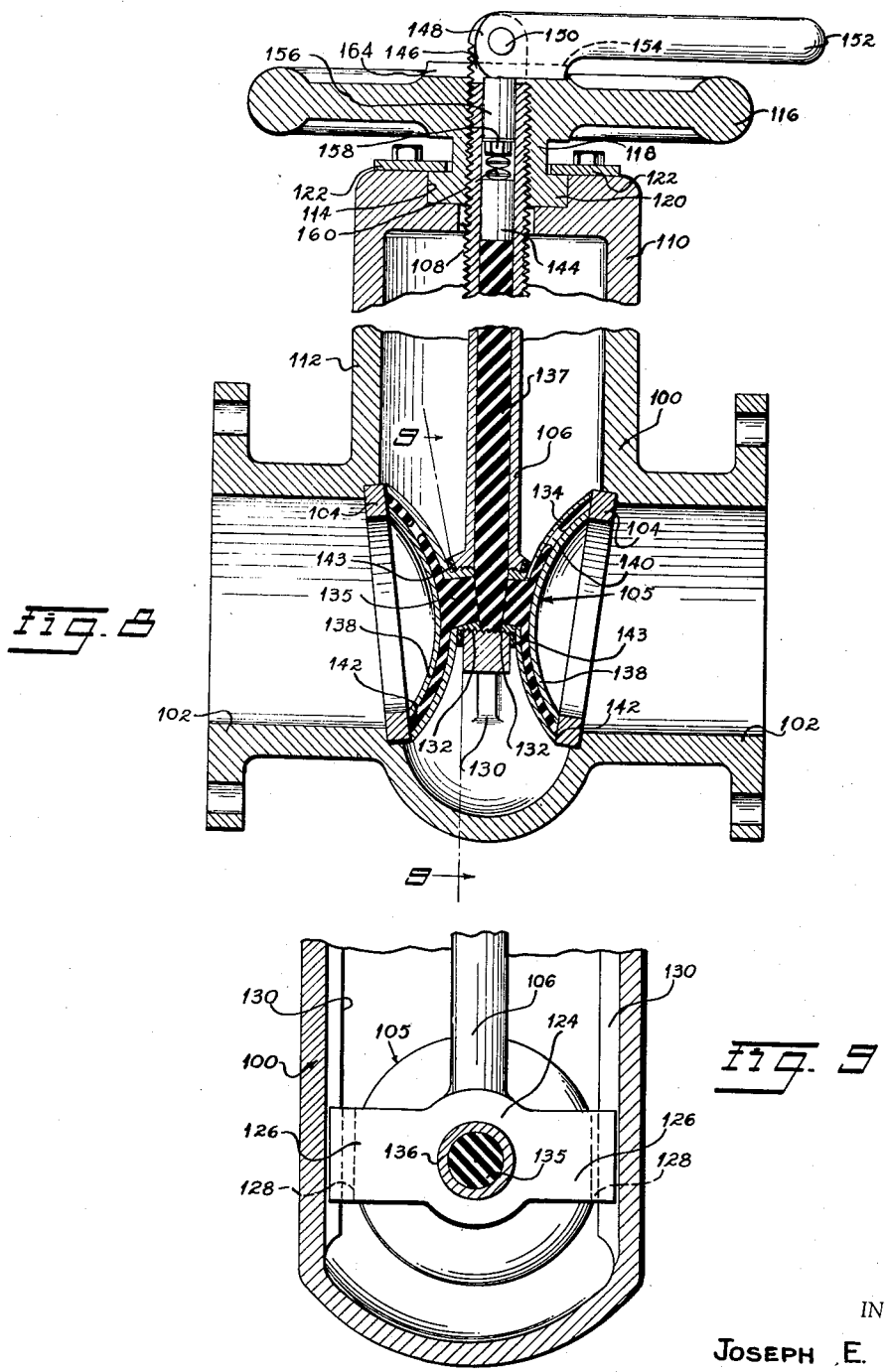
INVENTOR
JOSEPH E. LUCAS
BY Bacon + Thomas
ATTORNEYS

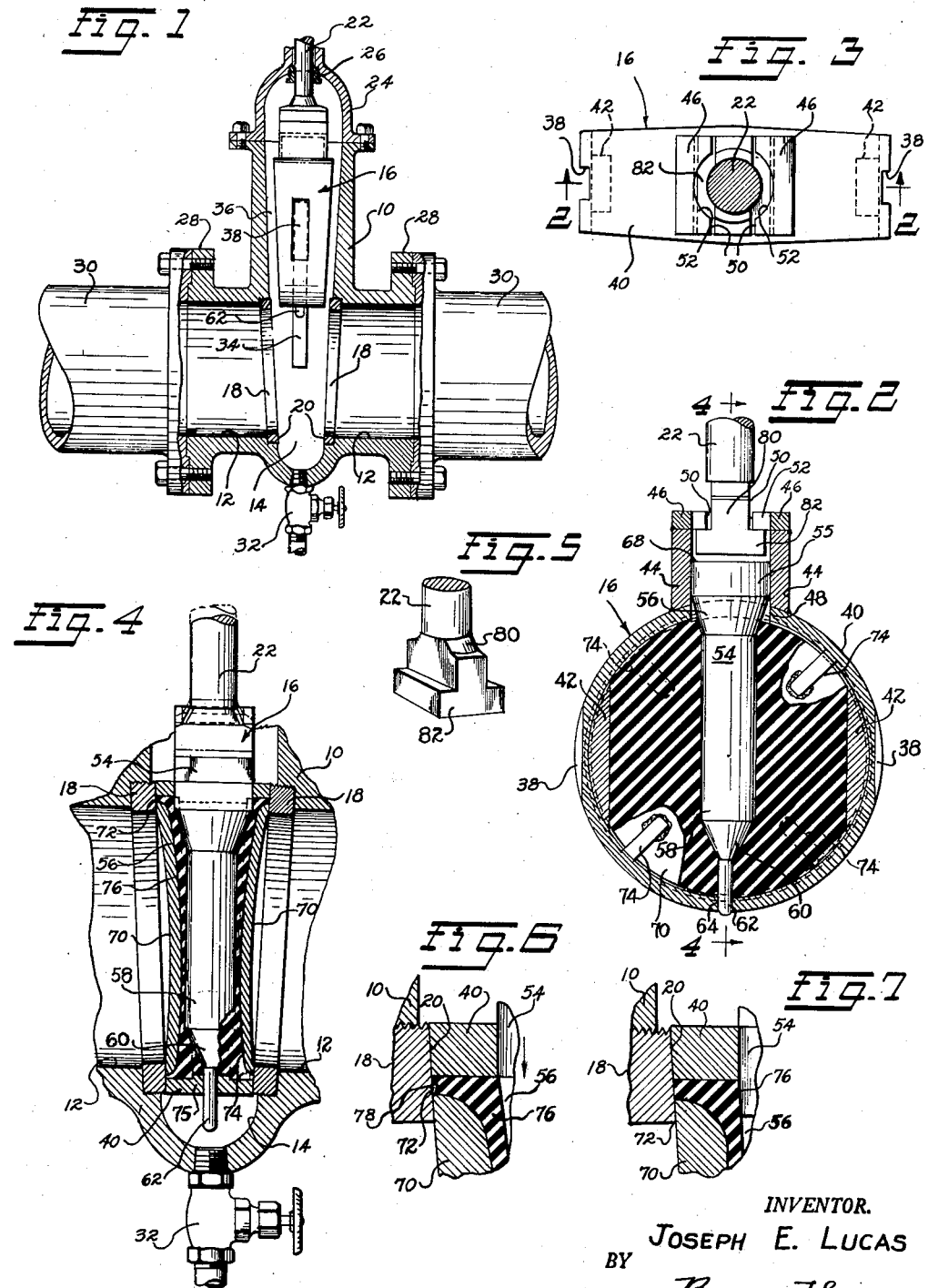

United States Patent Office 2,865,597
Patented Dec. 23, 1958

2,865,597

LEAKPROOF PRESSURE SEALED VALVES

Joseph E. Lucas, Caracas, Venezuela

Application July 21, 1953, Serial No. 369,382

14 Claims. (Cl. 251—187)

This invention relates to valves and, more particularly, to gate valves having elastic means for effecting a pressure seal after the disks of the gate member have been seated, and which seal is released before the disks are unseated.

An outstanding feature of the present valve constructions is that a body of elastic sealing material is carried by the movable gate or closure member but does not contact or rub against the valve seats during valve closing or opening movements and actually does not engage the valve seats in pressure sealing contact until after the valve disks have been fully seated and wherein the force applied to the sealing material is released before the gate starts to move to valve opening position. This results in a valve construction having greater efficiency and longer life than valves theretofore known.

In general, and in its broader aspects, the invention comprises a valve provided with a fixed valve seat surrounding a seat passageway and a valve closure member movable into seating relation to the seat. The valve closure member is provided with an annular groove or slot extending through its seat-engaging portions, such slot being in communication with a hollow interior chamber in the valve closure member. The hollow interior chamber is filled with a self-sustaining and solid but readily flowable body of elastic material and this material normally extends into the annular slot or groove to a position just short of the outer edge portion thereof. The groove is of such shape and size that it is completely covered by the valve seat when the valve closure member is in closed position. The valve actuating and sealing means of one form of the invention includes a non-rotatable stem having a plunger extending into the body of elastic material so that movement of the stem in valve closing direction first moves the valve closure member to a seated position on the valve seat and thereafter applies compression force to the elastic material by means of the plunger to cause hydraulic flow thereof outwardly of the groove into pressure sealing contact with the valve seat. In another form of the invention disclosed herein, force is applied by a plunger to the upper end of a column of the elastic material housed in a hollow valve stem to similarly displace said material to form a pressure seal, after the valve closure member has been seated.

It is, therefore, the principal object of this invention to provide a valve having elastic sealing means wherein a pressure seal is effected by said sealing means only after the parts have been moved to closed position.

It is another object of this invention to provide a valve adapted to be sealed by an elastic material which can be extruded to fill scratches, nicks, etc. in a valve seat, but wherein the elastic material does not rub against or slide over any portion of the valve seat, thus eliminating abrasion and wear of the sealing material and contributing to a longer life.

Another object of the invention is to provide a valve wherein a pressure seal is provided in addition to that provided by a valve disk.

Still another object of this invention is to provide a valve for high pressure pipe lines wherein extreme precision of manufacturing fit between the valve closure member and the valve seat is unnecessary.

Still another object of the invention is to provide a valve of unusually high efficiency and yet of simple and economical construction.

Still another object of the invention is to provide a pressure seal for valves which is readily adaptable to conventional gate-type valves.

A further object is to provide a sealed valve of the type set forth wherein the movable valve closure member cannot be moved to open position while the sealing material is in pressure contact with its seat.

Other objects and advantages will become apparent to those skilled in the art as the description proceeds in connection with the accompanying drawings, wherein:

Fig. 1 is a longitudinal sectional view of one form of valve embodying the present invention, with certain parts of the valve shown in elevation;

Fig. 2 is a transverse sectional view of the gate or movable valve member taken substantially along the line 2—2 of Fig. 3;

Fig. 3 is a top plan view of the valve member of Fig. 2 with a portion of the actuating stem shown in section;

Fig. 4 is a longitudinal sectional view of the valve member shown in Figs. 2 and 3 but with the valve member shown in seated relation to the valve body. The valve member of Fig. 4 is shown substantially as it would appear in a sectional view taken along the line 4—4 of Fig. 2;

Fig. 5 is a fragmentary perspective view of an end portion of the valve actuating stem;

Fig. 6 is a fragmentary sectional view of a portion of Fig. 4, on an enlarged scale, showing the relationship between the valve member and the valve seat just as the member is brought to seated position;

Fig. 7 is a view similar to Fig. 6 but showing the relationship of the parts after full pressure sealing has been effected;

Fig. 8 is a vertical sectional view of another embodiment of the invention; and

Fig. 9 is a transverse sectional view of a portion of the valve of Fig. 8 taken substantially along the line 9—9 of Fig. 8.

Referring first to the embodiment of Figs. 1 to 7, the valve comprises a valve body 10 of conventional gate valve construction wherein the body is provided with a through passage 12, the central portion of which is enlarged to form a transversely enlarged chamber 14 for the accommodation of a movable gate or valve closure member indicated generally at 16. The juncture between the passageway 12 and the chamber 14 is conventionally provided with seat inserts 18 having machined or ground surfaces 20 defining valve seats. As is conventional, the surfaces 20 lie in downwardly converging planes having a wedge-shaped space therebetween. The movable valve member 16 is of complementary wedge shape whereby movement into the space 14 between the valve seats 18 effects surface contact between the ends of the valve member 16 and the surfaces 20 to effectively close the passageway 12. The valve member 16 is conventionally moved from an open position alongside passageway 12, Fig. 1, to a closed position between valve seat surfaces 20 by means of a non-rotatable stem 22, as illustrated in Fig. 4. The stem 22 projects outwardly from the valve body 10 through a separable bonnet 24, which may be provided with the usual packing nut 26 to prevent leakage along the stem 22. The stem 22 may be moved longitudinally to open and close the valve by any suitable or conventional gate valve operating means (not shown).

The valve body 10 may be provided with the usual flanges 28 whereby the valve may be bolted to the flanged ends of pipes 30 in the usual manner. It is to be understood that the mode of connecting the valve body to the pipes 30 is not a part of the present invention and resort may be had to other conventional attachment means.

The valve body 10 may also be provided with a drain cock 32, which may be employed to drain the valve chamber 14 during periods of shut-down or may be employed as a bleeder leak detector, or for any other desired purpose.

As is also conventional, opposed side walls of the chamber 14 may be provided with parallel guide ribs 34 extending upwardly into an upward extension 36 of the chamber 14 and slidably received in guide grooves 38 (Figs. 2 and 3) on opposite sides of the valve member 16.

The valve member 16 comprises an annular, generally cylindrical hollow carrier 40 substantially equal in outside diameter to that of the seat inserts 18. The end faces of the carrier 40 are arranged in converging relation to define a general wedge shape complemental to the seat surfaces 20. As shown in Fig. 2, the guide grooves 38 extend through nearly the entire wall thickness of the carrier 40 so reinforcing elements 42 are welded or otherwise firmly secured to the inner surface of the carrier 40 to provide reinforcement for the thin bottom walls of the grooves 38. A neck structure comprising flat side plates 44 and top plate 46 is affixed to the upper or widest portion of the carrier 40, as by welding, or the like. The plates 44 are arranged in spaced parallel relation on opposite sides of an opening 48 extending through the carrier wall. The plates 46 are shown welded but may be bolted to the upper end of plates 44 and extend inwardly therefrom toward each other. The plates 46 are spaced apart at their inner edges 50 and are provided with notches or cutaway portions 52 generally concentric to and in alignment with the opening 48. A plunger 54 has an enlarged head portion 55 guided between the plates 44 and extends through the opening 48 into the hollow interior of the annular carrier 40. As is clearly shown in Fig. 2, the plunger 54 has a tapered portion 56 adjacent its upper end 55, an elongated cylindrical portion 58, and a lower tapered portion 60 adjacent its lower end. A cylindrical pilot portion 62 is disposed below the tapered portion 60 and extends through a guide opening 64 in the lower portion of the annular carrier 40. The head portion 55 of the plunger 54 lies between the plates 44 and terminates in an upper transverse surface 68.

The carrier 40 thus defines an open-ended annular structure having converging ends as shown. The open ends of the carrier 40 are substantially closed by concavo-convex valve disks 70 (Fig. 4) having an outside diameter less than the inside diameter of said carrier, but greater than that of the seat inserts 18, whereby the disks 70 when positioned within the carrier 40, as shown in Fig. 4, define with the carrier a continuous, uninterrupted annular groove or slot 72 extending completely around each of said disks and of such size as to confront the intermediate portions of the seat inserts 18. As is also clearly shown in Fig. 4, the peripheral portions of the disks 70 engage the inner peripheral portions of valve seat surfaces 20 when the valve member 16 is in closed position and the end walls of the carrier 40 engage the outer peripheral portions of those surfaces. Thus, the valve seat surfaces 20 span and close the slots or grooves 72 when the valve member 16 is in closed position.

Each of the disks 70 is preferably stamped from resilient metal, for example, rolled steel plate, and bowed inwardly and ground to the desired finish at the margin of its concave face to make seating contact with the seat surface 20. Each disk 70 is provided on its convex or inner face with a plurality of welded centering lugs 74 engaged with an annular abutment 75 within the carrier 40, which provides a fixed stop for the disks 70 to prevent axial movement thereof under line pressure as the closure member 16 is moved toward valve closing position. Any desired number of lugs 74 can be employed. Thus, the disks 70 are maintained substantially concentric with the carrier 40 and are positively prevented from moving axially in a direction toward the plunger 54. As is best shown in Fig. 4, the outer ends of the lugs 74 are spaced inwardly from the outer edges of the grooves 72.

The hollow interior of the carrier 40 is filled with an elastic sealing material 76. The elastic material 76 is vulcanized or otherwise bonded to the inner periphery of the carrier 40 and is also bonded to the inner faces of the disks 70, thus holding the disks in the described assembled relation to the carrier 40. The plunger 54 extends through the body of elastic material 76 but is not bonded thereto. In other words, the plunger 54 is freely slidable relative to the carrier 40 and the elastic material 76. The elastic material 76 also extends outwardly into the grooves or slots 72 (see Fig. 6) and is bonded to the peripheral portions of the disks 70 but does not completely fill the grooves 72. In its normal unstressed condition, the elastic material 76 has a surface 78 in the grooves 72 that is disposed axially inwardly of the coextensive converging surface portions of disks 70 and carrier 40 defining the tapered end walls of the valve member 16.

The elastic material 76 may be any self-sustaining solid elastic material having the characteristic of "flowing" under pressure. Such material may be natural rubber, synthetic rubber, "neoprene," "Thiokol," or any of the rubberlike synthetic materials of which many are known. These materials are substantially incompressible, but the application of pressure to the same causes displacement or "flow" in unconfined areas thereof. The specific material chosen for the body 76 should be inert to the liquids or gases flowing through the valve and should be selected from the particular class of materials that offer the desired resistance to changes in temperature or other conditions to which it is exposed.

The hardness of the material 76 is also quite important inasmuch as said material should have a hardness such that it will not begin to "flow" until after the gate valve member 16 has been moved to its fully closed position, yet should not be so hard that it will not seal scratches and nicks in the valve seat surfaces 20, which are otherwise difficult to seal by metal-to-metal contact. Material 76 having a durometer hardness of about 55 to 60 is satisfactory for valves operating under a working pressure of about 250 pounds per square inch. It will be understood that the durometer hardness of the material 76 will be varied to suit the line pressure against which the valve must close. The hardness of the material will, of course, affect its displacement properties, and also govern the design of the plunger 54. For example, in a 6 inch gate valve subject to a working pressure of about 250 pounds per square inch and provided with an elastic material having a durometer hardness of about 55 to 60, the projected area of the plunger 54 effective to displace the material 76 is about 1 square inch. The degree of displacement will vary, of course, with the extent of downward movement of the plunger 54. In any event, the hardness of the material 76 and the volumetric displacement thereof by the plunger 54, is such that the material 76 functions in a manner comparable to that of a confined liquid, and the greater the pressure applied, the tighter will be the seal at the grooves 72.

As has been previously pointed out, the valve disks 70 are bowed or dished inwardly of the valve member 16. This construction strengthens the disks 70 against the pressure applied thereto by the material 76 and permits the application of high unit pressures to the material 76 without causing the disks 70 to bulge or collapse outwardly. At the same time, the metal of the disks 70 is sufficiently resilient to permit the disks 70 to accommodate themselves to any slight distortion or misalignment that may be present in the seat inserts 18, so that the disks form a tight seal with said inserts, along with the seal effected by the carrier 40. The material 76 extruded through the annular slots 72 provides an additional seal intermediate the disks 70 and the carrier 40 that is maintained under constant, substantially uniform pressure, so that an absolutely leak proof valve results.

The actuating stem 22 is provided with a lower end portion of the general configuration shown in Fig. 5 and comprises a reduced neck portion 80 positioned between the spaced edges 50 of plates 46 (see Figs. 2 and 3) and a transversely enlarged head 82 positioned below the overhanging portions of plates 46. The vertical dimension of the head 82, that is, its dimension in the direction of movement thereof, is less than the normal spacing between the top surface 68 of plunger 54 and the lower surfaces of the plates 46. The reduced neck portion 80 is of sufficient length to permit the stem to be moved upwardly to bring its head 82 into contact with the overhanging portions of plates 46 or to be moved downwardly to engage the head 82 with the surface 68 of plunger 54. The cutaway portions 52 in plates 46 permit the stem 22 to be moved downwardly therethrough during the sealing operation to be described later.

From the structure thus far described, it will be apparent that upward movement of the stem 22 will cause head 82 to engage the overhanging plates 46 and thus positively withdraw the valve member 16 from its closed position between valve seats 20 (Fig. 4) to the fully open position shown in Fig. 1. With the parts in the open position shown in Fig. 1, when it is desired to close the valve, the stem 22 may be moved downwardly and the first part of that movement merely moves the head 82 into contact with the surface 68 of plunger 54. Continued downward movement of stem 22 moves the plunger 54, elastic material 76, and carrier 40 bodily downwardly to the position indicated in Fig. 6. Since the hardness of the elastic material is selected to be compatible with line pressure, the resistance to movement from the open position of Fig. 1 to the position of Fig. 6 is such that the plunger 54 will not move inwardly of carrier 40 and thus no deforming pressure is applied to elastic material 76 and the parts reach the Fig. 6 positions without sliding surfaces 78 over surfaces 20. However, as soon as the disks 70 and carrier 40 engage the valve seat surfaces 20, continued downward movement of the stem 22 causes plunger 54 to move into the carrier 40 and the tapered surfaces 56 and 60, or in other words, the stepped construction of the plunger 54 displaces or applies expanding pressure to the body 76 of elastic material and that material is caused to "flow" outwardly in the grooves or slots 72 until the space between surface 78 and valve seat surfaces 20 is completely filled and the body of elastic material 76 is placed under internal pressure sufficient to effect a complete and perfect seal against the surfaces 20, as shown in Fig. 7. At the same time the pressure of the material 76 against the inner faces of disks 70 presses those disks firmly against surfaces 20 into intimate pressure contact therewith thus eliminating the necessity of machining the surfaces of disks 70 to a high degree of precision. The disks 70 are slightly flexible to insure seating of all portions of their peripheries against surfaces 20. It is to be noted that in Fig. 6 the plunger 54 is in its upper position relative to carrier 40, whereas in Fig. 7 the plunger is in a lower position wherein the plunger occupies a greater portion of the hollow interior of the valve member and, therefore, the elastic material 76 is placed under compression and forced into intimate pressure contact with valve seats 20 at grooves or slots 72.

Upon upward movement of the stem 22, the head 82 thereof is first retracted from surface 68 of plunger 54 and the internal pressure present in the elastic material 76 causes plunger 54 to automatically retract or follow the movement of the head 82 upwardly until that pressure is relieved and the elastic material 76 reassumes its normal unstressed condition wherein the surfaces 78 are withdrawn from the surface 20. It is preferred that the head 82 be of such dimensions that the plunger 54, at its upper limit of movement, is spaced downwardly from the head 82 when the latter is in contact with the overhanging plates 46. Continued upward movement of stem 22 then positively retracts the carrier 40 from between valve seats 18, but such movement of the carrier 40 is not started until after pressure in the elastic material 76 has been completely relieved and the surfaces 78 (Fig. 6) withdrawn from the surfaces 20, so that no sliding movement or possibility of abrasion occurs between the elastic material 76 and the valve seat surfaces 20. It is to be noted that high pressures within the passageway 12, when the valve is in closed position, exert a large total force on the disk 70 exposed to such pressure and would tend to move the disk 70 inwardly away from its valve seat 20. Such inward movement of the disk 70 could conceivably break the seal between material 76 and the valve seat 18 and thus negative the advantages of the invention. However, since the disks 70 are mutually supported on the carrier 40 by the lugs 74, such inward movement of the disks is prevented, although pressure engagement of the disks 70 with their associated seats 18 by the elastic material 76, requiring possible slight movement in the opposite direction, is not hindered in any way.

The valve body 100 of the embodiment shown in Figs. 8 and 9 is of a construction somewhat similar to that of the valve shown in Fig. 1 but with differences to be further described. Valve body 100 is provided with a through passage 102 having opposed valve seats 104 surrounding the passageway 102 and defining a wedge-shaped space therebetween. The movable gate or valve member 105 comprises a hollow stem 106 having a smooth outer surface at its lower portion and being externally threaded at its upper portion. The upper portion of the stem 106 extends outwardly through a clearance opening 108 in a bonnet member 110. The lower portion of the stem 106 passes through a suitable packing gland (not shown) mounted in a transverse partition (not shown) in the upper extension 112 of the valve body 100. The transverse partition and packing gland although not shown are to be understood as being of conventional construction and therefore need not be further described. The bonnet 110, previously referred to, is mounted on the valve body 100 above the partition (not shown) and is provided with a recess 114 consisting of a counter bore concentric to the opening 108.

A hand wheel 116 having an internally threaded hub 118 is mounted with its head or enlargement 120 in the recess 114. Suitable cap or retaining plates 122 hold the head 120 in recess 114 and prevent its withdrawal therefrom while permitting free rotary movement of the hand wheel 116.

The stem 106 terminates at its lower end in an integral enlarged portion 124 having laterally extending ears or guide elements 126 (Fig. 9). The ears 126 are provided with vertically extending guide slots 128 at their outer ends and those slots embrace vertically extending guide ribs 130 formed on the inner surface of the valve body 100. The ears 126 and slots 128 thus guide the stem 106 for vertical movement while preventing rotation thereof about the axis of the stem. Thus, it will be apparent that rotation of the hand wheel 116 will result in vertical movement of the stem 106.

The stem 106 is hollow through its upper end to a point within the enlargement 124. The enlargement 124 is provided with laterally directed threaded openings 132 disposed perpendicular to the plane of the seats 104 and communicating with the hollow interior of the stem 106. Each of the openings 132 provides a support for a generally saucer-shaped shell 134 having a threaded neck portion 136 threaded into the opening 132. The shells 134 are so arranged that their outer peripheral edges lie in downwardly converging planes so that those edges may be simultaneously seated against the valve seats 104 when the valve gate 105 is in closed position.

An inwardly bowed flexible disk 138 is nested within each of the shells 134 but is spaced therefrom to define a hollow space therebetween. Suitable cylindrical spacing lugs or the like 140 may be secured to the shells 134 and disks 138 in any suitable manner, such as welding, to hold the disks in the described relationship to the shells 134. The outer peripheral edges of the discs 138 are ground co-planar with corresponding edges of the shells 134, but are spaced therefrom and thereby define peripheral grooves 142 of such size and shape that they are completely spanned and closed by the inner surface of the valve seats 104 when the valve gate 105 is in closed position. Shims 143 are interposed between the enlargements 124 and the adjacent face of the shells 134 to adjust the disks 138 for proper axial spacing to index the same with the seats 104 in concentric relation thereto. Moreover, the threaded mounting of the disk asesmblies on the stem 106 provides for easy replacement or refacing thereof.

The hollow space between disks 138 and shells 134 is filled with a self-sustaining solid "flowable" sealing material 135 of the same type as described in connection with Figs. 1 to 7. The sealing material 135 extends into the opening in the neck portions 136 and is bonded to the disk assembly. A solid cylinder of elastic material 137 is disposed in the hollow interior of stem 106 and extends upwardly therein to be contacted by the lower surface of a slidable plunger 144. The elastic material 137 is preferably unattached to the stem 106 to permit free displacement under compression by the plunger 144. It will be understood, however, the the disk assemblies and the stem 106 may be filled with an integral mass of the elastic material introduced after the gate parts have been assembled, and then vulcanized in place, if such construction is desired.

The uppermost end of stem 106 is slotted, as at 146 and a cam 148 is pivoted within the slot 146 by a suitable pivot pin 150. The cam 148 includes a handle portion 152 and a detent 154. An upper plunger 156 is slidably positioned in the stem 106 below cam 148 and may be provided with an adjustable abutment 158 whereby its effective length may be varied. Between the abutment 158 and plunger 144 a plurality of "Belleville" springs 160 are interposed to compensate for excess pressure resulting from expansion of the elastic material 162 due to the differences in the coefficients of expansion of the metal parts of the valve and gate assembly and of the elastic sealing material itself. The springs 160 consist essentially of dished disks placed face-to-face and adapted to yield under given pressure conditions. The hub of hand wheel 116 is provided with a plurality of radially extending slots or grooves 164 in the upper portion thereof so arranged that the detent 154 is receivable in a selected one of said grooves when the handle 152 is moved to its downward position shown in Fig. 8.

When the handle 152 is pivoted about pin 150 to an upright position, the cam 148 relieves the pressure on the plunger 156 and thus permits the elastic material 137 to expand and assume an unstressed condition. When the handle 152 and, consequently cam 148, is in the position shown in Fig. 8, the plungers 156 and 144 are forced downwardly thus applying pressure to the elastic material 137 and thence to the elastic material 135 causing flow thereof outwardly of the circumferential grooves 142 into pressure sealing relation with the valve seats 104.

It is to be understood that, when the elastic material 137 is in an unstressed condition, the surface thereof in the grooves 142 is disposed inwardly of the plane defined by the edges of the disks 138 and shells 134, whereby the surface of the elastic material does not contact seats 104. Thus, proper rotation of hand wheel 116 with handle 152 in its raised position, moves the valve gate 105 to its closed position without engaging the elastic material 137 with the valve seats 104 and thus without causing abrasion of the elastic material. After the disks 138 and shells 134 are firmly seated against valve seats 104, the handle 152 is moved to its lowered horizontal position shown in Fig. 8, wherein detent 154 is in one of the grooves 164 and the hand wheel 116 is thereby locked against rotation. By so locking the hand wheel 116 under these conditions, it is impossible to raise the stem 102 to withdraw the disks 138 from seats 104. Withdrawal thereof may be effected only after moving handle 152 upwardly to relieve pressure on the elastic material 135 and permit that material to withdraw from valve seats 104. Thus, the valve cannot be opened until after the pressure on the sealing material at the grooves 142 has been relieved.

While specific embodiments of the invention have been shown and described herein in connection with gate valves, it is to be understood that such description is for purpose of illustration only and the invention is not to be limited thereto but shall encompass all modifications and other types of valves falling fairly within the scope of the appended claims.

I claim:

1. In a valve, a valve closure member comprising a substantially rigid generally wedge-shaped hollow body having converging planar sides; a pair of valve discs; means maintaining the peripheries of said discs in spaced substantially concentric relation to peripheral portions of said sides of said hollow body to provide a continuous annular space therebetween in each of said sides; a flowable elastic sealing material confined in said body and extending into said spaces but normally lying within the edges of said body and discs defining said spaces and means movable relative to said hollow body for applying pressure to said confined material to cause a portion thereof to be displaced outwardly into said spaces.

2. A valve comprising, a valve body having a passageway for fluid; opposed relatively inclined valve seats surrounding said passageway; a generally wedge-shaped hollow valve closure member having converging planar sides mounted on said body for movement to a closed position between and in engagement with said valve seats, said valve closure member having a relatively narrow continuous annular groove in the planar surface of the planar sides thereof, said grooves communicating with the hollow interior of said valve closure member and being completely covered by said valve seat when in closed position; a body of self-sustaining and solid but flowable elastic material substantially filling said hollow valve closure member and substantially filling said groove; and valve closing and sealing means movable relative to said valve body and said hollow valve closure member and into pressure engagement with said body of elastic material, whereby valve closing movement of said means causes said valve closure member to engage said valve seat and thereafter applies pressure to said elastic material to cause flow thereof outwardly with respect to said grooves and into pressure sealing contact with said valve seat.

3. A valve as defined in claim 2, wherein the valve closing means includes resilient means for relieving excess pressure on said elastic material, said resilient means comprising a plurailty of resilient dished discs in opposed abutting relationship.

4. A valve as defined in claim 2, wherein the portion of said valve member encompassed by said annular groove comprises a separate disk bonded to said body of elastic material.

5. A valve comprising, a valve body having a passageway therethrough; spaced opposed valve seats in said body; each of said valve seats defining an annular surface surrounding said passageway and facing the corresponding surface of the other valve seat; a valve closure member movably mounted in said body for movement transversely of said passageway from an open position alongside said passageway to a closed position between said valve seats, said valve closure member including a generally cylindrical hollow carrier having annular end surfaces complementary to the outer portions of said valve seat surfaces and engageable therewith when in said closed position; a sealing disk in each end of said carrier disposed radially inwardly of said annular end surfaces, said disks having annular surfaces thereon engageable with the inner portions of said valve seat surfaces, a body of solid but flowable elastic material substantially filling said hollow carrier between said disks, said disks being secured to and supported by said body of material; and means for applying pressure to said body of material when said valve member is in closed position whereby to apply outward pressure to said disks and force said disks into sealing contact with said valve seat surfaces.

6. A valve as defined in claim 5, wherein said disks are flexible and are spaced radially inwardly of said annular end surfaces leaving annular grooves therebetween, said body of material extending into said grooves, whereby the application of pressure to said body of material causes said material to flow outwardly of said grooves into sealing contact with said valve seat surfaces.

7. A valve as defined in claim 5, wherein said last-named means comprises a plunger extending slidably through a side of said hollow carrier into contact with said body of material, said plunger arranged to be actuated by means for moving said valve closure member between said open and closed positions.

8. A gate valve comprising, a valve body having a passageway therethrough, opposed valve seats surrounding said passageway and defining a wedge-shaped space therebetween, a hollow wedge-shaped valve closure member having opposed converging end walls movable in said body between an open position alongside said passageway and a closed position between said valve seats with the opposed converging end walls of said valve member in sealing engagement with said valve seats, said valve member comprising a substantially rigid hollow carrier defining the side walls of said closure member and the outer peripheral portions of said converging end walls; a disk defining the inner portion of each of said end walls, said disks being spaced, at their peripheries, from adjacent portions of said carrier and defining therewith an annular groove through each of said end walls, said grooves being covered by said valve seats in said closed position; a body of solid but flowable material substantially filling said hollow valve member and all but the outermost portions of said grooves; a plunger slidable through a side wall of said carrier in the direction of convergence of said end walls, the inner portion of said plunger engaging said body of material, and means for applying pressure to said plunger to move said valve closure member to closed position and thereafter move said plunger inwardly of said carrier to apply pressure to said body of material.

9. A valve as defined in claim 8, wherein said plunger extends slidably into said body of material between said disks for applying pressure to said material and wherein said means for applying pressure to said plunger is free from direct connection with said plunger.

10. A valve as defined in claim 8, wherein said plunger extends through the hollow interior of said valve member and is provided therein with stepped tapered surfaces in engagement with said body of material adjacent the periphery of each of said disks.

11. A valve as defined in claim 8, wherein said carrier is provided with a fixed abutment spaced outwardly from the outer end of said plunger and wherein said last-named means includes an actuating stem having a head portion movable between the outer end of said plunger and said abutment whereby movement of said stem inwardly causes said head portion to engage said plunger and thereby move said valve closure member to closed position, and movement of said stem outwardly permits said material to return to its initial state and force retraction of said plunger, and causes said head portion to engage said abutment and move said valve closure member to open position.

12. A gate valve comprising, a valve body having a passageway therethrough; opposed valve seats surrounding said passageway and defining a wedge-shaped space therebetween; a hollow wedge-shaped gate having opposed converging end walls movable in said body between an open position alongside said passageway and a closed position between said valve seats with the opposed converging end walls of said gate in sealing engagement with said valve seats, said gate comprising a hollow carrier defining at least the outer peripheral portions of said converging end walls, a disk defining the inner portion of each said end walls, said disks being spaced, at their peripheries, from adjacent portions of said carrier and defining therewith an open annular groove through each of said end walls, said grooves being covered by said valve seats in said closed position; a body of solid but flowable material substantially filling said hollow valve member and all but the outermost portions of said grooves; and means for sequentially moving said valve member to closed position and thereafter applying pressure to said body of material to force said material into direct sealing contact with said valve seats.

13. A valve as defined in claim 12 wherein said carrier includes a hollow actuating stem extending outwardly of said valve body, said body of material extending into said hollow stem; actuating means rotatably mounted on said valve body and threadedly engaging said stem for moving said gate to and from closed position; pressure applying means moveably mounted on said stem and arranged to apply pressure to the body of material therein when moved to a predetermined position on said stem, said pressure applying means having portions engaging said actuating means when in said predetermined position, whereby to lock said actuating means against rotation while said body of material is under pressure.

14. A valve as defined in claim 12 wherein said carrier includes an externally threaded hollow stem, said body of material extending into said stem; an internally threaded hand wheel rotatably mounted on said valve body about said stem and arranged to move said valve member to and from closed position; a plunger in said stem engaging said body of material, a cam pivotally mounted in said stem and arranged, in one position thereof, to apply pressure to said plunger and body of material; an actuating handle for said cam; a detent on said handle, and notches on said hand wheel in position to relatively receive said detent when said cam is in said one position, whereby said hand wheel is locked against rotation when said body of material is under pressure.

References Cited in the file of this patent

UNITED STATES PATENTS

| 1,004,845 | Bohme | Oct. 3, 1911 |
| 1,476,862 | Wagner | Dec. 11, 1923 |
| 2,194,256 | Allen | Mar. 19, 1940 |
| 2,229,871 | Pennick | Jan. 28, 1941 |
| 2,238,357 | Allen | Apr. 15, 1941 |
| 2,552,991 | McWhorter | May 15, 1951 |
| 2,567,032 | Schmidt | Sept. 4, 1951 |
| 2,734,714 | Knox | Feb. 14, 1956 |
| 2,734,715 | Knox | Feb. 14, 1956 |